United States Patent [19]

Dugan

[11] Patent Number: 5,558,748

[45] Date of Patent: Sep. 24, 1996

[54] PLATE-TYPE DISTILLATION/CONDENSATION APPARATUS AND METHOD OF USE

[75] Inventor: Jeffrey S. Dugan, Asheville, N.C.

[73] Assignee: BASF Corporation, Mount Olive, N.J.

[21] Appl. No.: 440,346

[22] Filed: May 12, 1995

[51] Int. Cl.$^6$ .................. B01D 3/14; B01D 3/00
[52] U.S. Cl. .................. 203/87; 203/86; 203/100; 159/28.6; 202/155; 202/158; 202/186; 165/166; 165/167
[58] Field of Search .................. 202/182, 185.1, 202/186, 155, 158; 203/87, 82, 86, 100; 422/280, 290; 165/118, 110, 160, 167, 114, DIG. 184; 159/49, DIG. 32, DIG. 43, 28.6

[56] References Cited

U.S. PATENT DOCUMENTS

| | | | |
|---|---|---|---|
| 3,291,704 | 6/1963 | Diedrich et al. | 203/87 |
| 3,568,462 | 11/1967 | Hoffman et al. | 62/42 |
| 4,133,377 | 1/1979 | de Lallee et al. | 165/118 |
| 4,237,970 | 12/1980 | Uehara et al. | 165/110 |
| 4,330,308 | 5/1982 | Grenier et al. | 62/40 |
| 4,392,362 | 7/1983 | Little | 62/514 R |
| 4,715,433 | 12/1987 | Schwarz et al. | 165/110 |
| 4,763,488 | 8/1988 | Johnston | 62/497 |
| 4,848,314 | 7/1989 | Bentley | 126/116 R |
| 4,878,535 | 11/1989 | Rosenblad | 165/114 |
| 4,917,769 | 4/1990 | Van Horn | 202/152 |
| 4,969,507 | 11/1990 | Rosenblad | 165/1 |

*Primary Examiner*—N. Bhat
*Attorney, Agent, or Firm*—Depaoli & Frenkel, P.C.

[57] ABSTRACT

A plate-type distillation/condensation apparatus and a method of using same to separate at least two volatility-differing liquid or vapor components from a mixed fluid stream thereof are disclosed, wherein the apparatus contains at least one flow plate having formed on a common facial surface thereof at least one distillation/condensation chamber containing an inlet port for the mixed fluid stream; a primary flow channel in fluid communication with the inlet port; one heat exchange conduits, wherein (i) a first heat exchange conduit for a first cooling fluid is disposed in a first heat exchange contact with the primary flow channel sufficient to condense at least a portion of a first vapor component into a first condensate phase, or (ii) a first heat exchange conduit for a heating fluid is disposed in a second heat exchange contact with the primary flow channel sufficient to boil at least a portion of a first liquid component into a first vapor phase, and a second heat exchange conduit for a second cooling fluid is disposed in a third heat exchange contact with the primary flow channel sufficient to condense at least a portion of the first vapor phase into a first condensate phase; at least one side outlet port; and an overhead outlet port.

33 Claims, 1 Drawing Sheet

PLATE-TYPE DISTILLATION/CONDENSATION APPARATUS AND METHOD OF USE

BACKGROUND OF THE INVENTION

This invention relates to a plate-type distillation/condensation apparatus and a method of using same. More particularly, this invention relates to a plate-type distillation/condensation apparatus wherein heat exchange is used to separate fluid components of different volatility from a fluid mixture thereof.

Distillation apparatuses are frequently used to process fluid mixtures for separation of the components therein, e.g., for the separation of components of a liquid/liquid fluid mixture. Condensation apparatuses are useful in applications requiring the liquification of steam or other vapors.

Plate-type distillation/condensation apparatuses are useful in industrial applications which require high performance and efficiency with relatively low cost, small volume, and light weight.

Plate-type distillation and condensation apparatuses are disclosed, e.g., in U.S. Pat. Nos. 3,291,704; 3,568,462; 4,237,970; 4,763,488; 4,969,507; 4,848,314; and 4,392,362.

However, many conventional plate-type distillation and condensation apparatuses still have drawbacks. One common drawback found in conventional apparatuses is an undesirably bulky structure. For example, many conventional apparatuses are composed of thick plates, which tend to be relatively expensive to make and to machine. Furthermore, bulky structures, including those composed of thick plates, tend to be relatively difficult and time-consuming to clean, inspect and re-use.

It would be desirable, therefore, to provide a plate-type distillation/condensation apparatus which is less bulky and less expensive to make, inspect, clean, re-use or replace. Less bulky plate-type distillation/condensation apparatuses can be produced more economically and more efficiently on demand with a variety of different interchangeable structures to satisfy a wide variety of needs.

Another drawback to conventional plate-type distillation and/or condensation apparatuses is the need therein for two or more plates. The use of multiple plates tends to further increase the bulkiness of the apparatus. Thus, it would be further desirable to provide a plate-type distillation/condensation apparatus which can provide heat exchange, distillation and/or condensation using only one plate. Moreover, it would be desirable to provide a plate-type distillation/condensation apparatus which can provide heat exchange, distillation and/or condensation apparatus on a single surface of a single plate.

Accordingly, a primary object of this invention is to provide a distillation/condensation apparatus which is less bulky and less expensive to make, inspect, clean, re-use or replace.

Another object of this invention is to provide a distillation/condensation apparatus capable of providing heat exchange, distillation and/or condensation by means of a single plate.

A further object of this invention is to provide a distillation/condensation apparatus capable of providing heat exchange, distillation and/or condensation by means of a single surface of a single plate.

An additional object of this invention is to provide a method of separating two or more fluid components of differing volatilities by means of a plate-type distillation/condensation apparatus having the characteristics described in the foregoing objects.

These and other objects which are achieved according to the present invention can be discerned from the following description.

SUMMARY OF THE INVENTION

One aspect of the present invention is directed to a distillation/condensation apparatus containing at least one flow plate having formed on a common facial surface thereof at least one distillation/condensation chamber containing:

an inlet port for a mixed fluid stream containing a plurality of volatility-differing liquid or vapor components;

a primary flow channel in fluid communication with the inlet port;

one or more heat exchange conduits, wherein (i) a first heat exchange conduit for a first cooling fluid is disposed in a first heat exchange contact with the primary flow channel sufficient to condense at least a portion of a first vapor component into a first condensate phase, or (ii) a first heat exchange conduit for a heating fluid is disposed in a second heat exchange contact with the primary flow channel sufficient to boil at least a portion of a first liquid component into a first vapor phase, and a second heat exchange conduit for a second cooling fluid is disposed in a third heat exchange contact with the primary flow channel sufficient to condense at least a portion of the first vapor phase into a first condensate phase;

at least one side outlet port; and an overhead outlet port.

A second aspect of the present invention is directed to a method of separating two or more volatility-differing vapor components or liquid components from a mixed fluid stream thereof by means of the distillation/condensation apparatus of this invention, wherein the method involves passing the mixed fluid stream through the at least one distillation/condensation chamber.

The distillation/condensation apparatus of this invention is compact and relatively easy and inexpensive to make, inspect, clean, re-use and replace. Furthermore, the distillation/condensation apparatus of this invention can provide heat exchange, distillation and/or condensation by means of a single flow plate, more particularly, by means of a single surface of a single flow plate.

In addition, the apparatus of this invention can be composed of a thin plate or a plurality of thin plates which can be relatively cheaply and easily micromachined, preferably etched. Micromachining, particularly etching, of the flow plate(s) permits, at little or no extra cost, the addition to the apparatus of a large number of distillation/condensation chambers disposed in parallel side-by-side configurations and/or joined in serial end-to-end fashion. A large number of such chambers will in turn improve the purity of the component streams separated by means of the method and apparatus of the present invention. In addition, by etching branched or joined streams between distillation/condensation chambers, control over flow rates through individual chambers can be achieved. The use of etched distillation/condensation flow plates can, therefore, permit fine tuning of the distillation/condensation method of this invention for optimum results with little or no extra effort and cost.

DETAILED DESCRIPTION OF THE INVENTION

Figure 1:
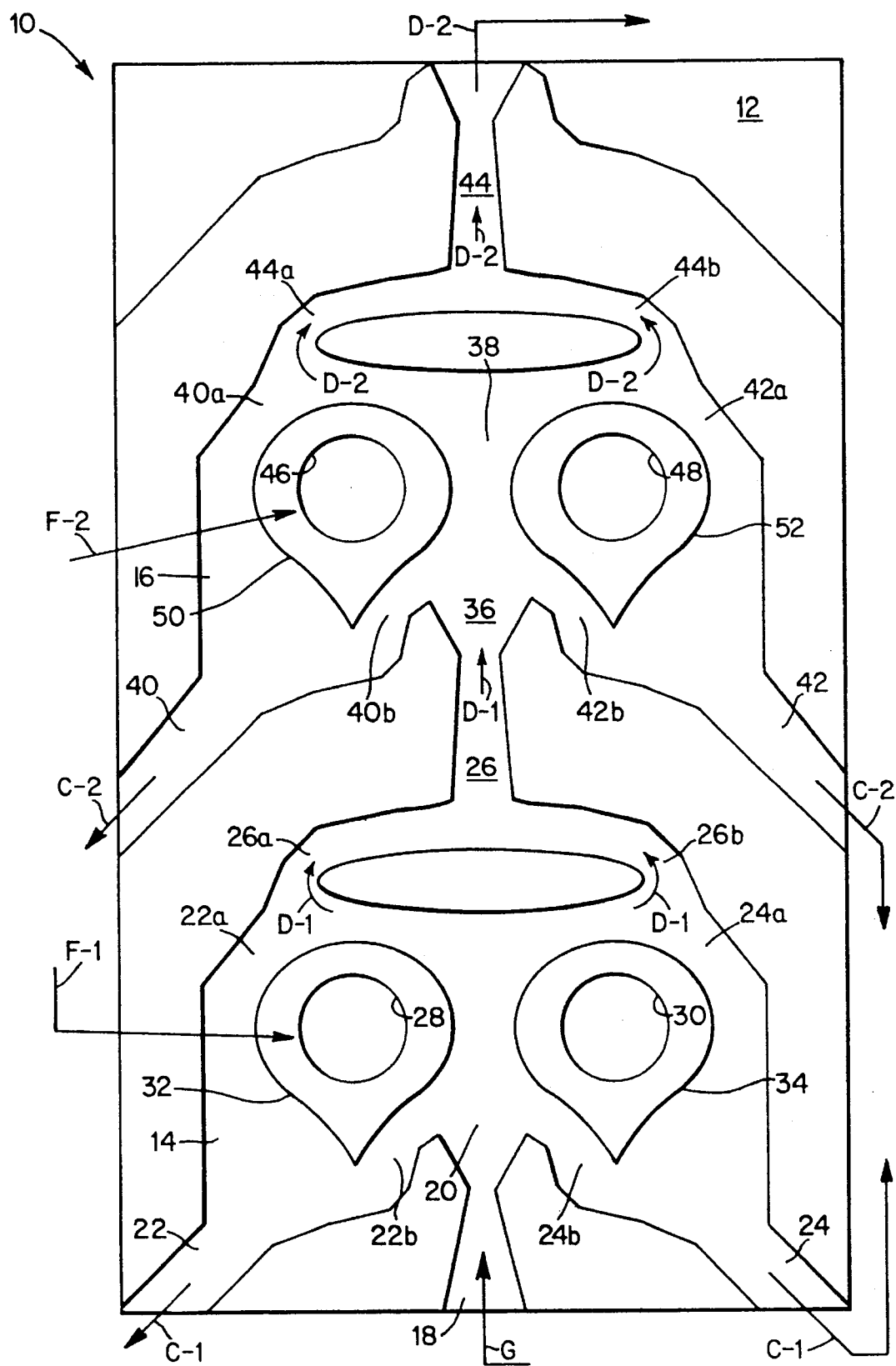
FIG. 1 is a schematic representation of a flow plate of a distillation/condensation apparatus within the scope of this invention.

The apparatus of this invention can be used to carry out condensation or distillation processes and is therefore referred to herein as a "distillation/condensation" apparatus.

The plate-type distillation/condensation apparatus and method of this invention are used to separate a plurality of volatility-differing liquid or vapor components from a mixed fluid stream thereof. Preferably, the more volatile components will be separated from the mixed fluid stream prior to the less volatile components. Thus, in a mixed vapor stream, the vapor component having the highest boiling point will preferably be condensed first, with the vapor component having the next highest boiling point being condensed second, and so on. In a mixed liquid stream, the liquid component having the lowest boiling point will be boiled first, the liquid component having the next lowest boiling point will be boiled second, and so on.

The mixed fluid stream which undergoes condensation or distillation in accordance with the present invention is preferably a mixed liquid stream composed entirely of liquid components, a mixed vapor stream composed entirely of vapor components, or a mixed vapor/liquid stream composed of one or more vapor components and one or more liquid components.

The distillation/condensation apparatus of this invention contains at least one flow plate having formed on a common facial surface thereof at least one distillation/condensation chamber. Each chamber contains an inlet port for the mixed fluid stream; a primary flow channel in fluid communication with the inlet port; one or more heat exchange conduits in heat exchange contact with the primary flow channel; and an overhead outlet port.

In an embodiment particularly useful with mixed vapor streams or mixed vapor/liquid streams, the one or more heat exchange conduits contains a first heat exchange conduit for a first cooling fluid, wherein the first heat exchange conduit is disposed in a first heat exchange contact with the primary flow channel. This first heat exchange contact is sufficient to condense into a first condensate phase at least a portion of a first vapor component in the mixed fluid stream. The condensate is preferably collected in the side outlet channel(s) and thereby removed from the distillate phase. The distillate phase may then undergo additional condensation to remove additional vapor components or distillation to remove any liquid components. Such additional condensation or distillation may be carried out in the same distillation/condensation chamber in which the first condensate phase was formed or in one or more downstream distillation/condensation chambers. In preferred embodiments, cooling fluids used in subsequent condensation steps will have a lower temperature than a cooling fluid used in the preceding condensation step. The distillate phase is preferably passed from the distillation/condensation chamber by means of the overhead outlet channel.

In a second embodiment which is preferred when the mixed fluid stream is a mixed liquid stream, the one or more heat exchange conduits contains a first heat exchange conduit for a heating fluid and a second heat exchange conduit for a first cooling fluid. The first heat exchange conduit is disposed in a first heat exchange contact with the primary flow channel which is sufficient to boil at least a portion of a first liquid component into a first vapor phase. The second heat exchange conduit for a first cooling fluid is disposed in a second heat exchange contact with the primary flow channel which is sufficient to condense at least a portion of the first vapor phase into a first condensate phase, which is preferably removed from the primary flow channel by means of the side outlet channel(s). If two or more liquid components remain in the distillate phase, the distillate phase preferably undergoes additional distillation processes to remove the liquid components. Thus, a second liquid component is preferably caused to boil into a second vapor phase by means of a third heat exchange conduit for a second heating fluid which is disposed in heat exchange contact with the primary flow channel in the first distillation/condensation chamber or in a second distillation/condensation chamber disposed downstream of and in fluid communication with the first distillation/condensation chamber. The second vapor phase is then preferably condensed into a second condensate phase by means of a fourth heat exchange conduit for a second cooling fluid. Preferably, the second cooling fluid will have a lower temperature than the first cooling fluid, since the second vapor component will preferably have a lower boiling point than the first vapor component. Also preferably, the second condensate phase will be removed from the primary flow channel by means of one or more additional side outlet channels.

When a plurality of heat exchange conduits are present, the heat exchange conduits need not all be disposed in the same distillation/condensation chamber. Each heat exchange conduit (particularly those for cooling fluids) may be disposed in a separate distillation/condensation chamber, wherein each of the chambers is disposed in fluid communication with a preceding and subsequent chamber. Alternatively, all or some of the heat exchange conduits (if more than one heat exchange conduit is present) may be disposed in a single distillation/condensation chamber. Preferably, when the distillation/condensation chamber is to be used as a condensation chamber, the condensation chamber will contain only that heat exchange conduit needed to condense one vapor component, and the apparatus will contain a separate condensation chamber for each vapor component to be condensed. If the distillation/condensation chamber is to be used as a distillation chamber, the chamber will preferably contain only those heat exchange conduits needed to boil one liquid component into a vapor phase and to condense the vapor phase into a condensate phase, and the apparatus will preferably contain a separate distillation chamber for each liquid component to be distilled.

In the apparatus of this invention, the number of distillation/condensation chambers will depend in part on the number of volatility-differing components in the mixed fluid stream, as well as on the degree of separation desired, temperature of the heat exchange fluid(s), dimensions of the primary flow channel and the like. Preferably, the number of distillation/condensation chambers will be at least equal to the number of volatility-differing components minus one. Thus, for example, where the mixed fluid stream contains two volatility-differing components, the apparatus will preferably contain at least one distillation/condensation chamber. Likewise, if the mixed fluid stream contains three volatility-differing components, the apparatus will preferably contain at least two distillation/condensation chambers.

As previously mentioned herein, the side outlet channel(s) is preferably disposed to collect the condensate phase formed in the primary flow channel. In more preferred embodiments, the chamber(s) contains a plurality of the side outlet channels. The overhead outlet channel is preferably disposed to collect the distillate phase of the mixed fluid stream.

In preferred embodiments of the distillation/condensation apparatus of this invention, the flow plate(s) is disposed in a vertical direction such that the inlet port is situated below the overhead outlet channel. This allows a condensate phase to move under the force of gravity into the one or more side outlet channels.

The heat exchange conduit(s) in the chamber(s) is preferably composed of a through-hole transversing the flow plate from the common facial surface to an opposite second facial surface.

The apparatus of this invention may be composed of one distillation/condensation chamber or a plurality of distillation/condensation chambers. If the apparatus contains a plurality of the chambers, the chambers are preferably arranged in an end-to-end configuration and/or in a side-by-side configuration.

Furthermore, the distillation/condensation apparatus of this invention may be composed of a single flow plate or a plurality of flow plates. When the apparatus contains a plurality of flow plates, the plates are preferably arranged in an end-to-end configuration, a side-by-side configuration and/or a front-to-back facial configuration.

In the most preferred embodiments of the present invention, one or more cover plates are used to cover the flow plate(s) in the apparatus of this invention. The cover plate(s) is disposed on the flow plate(s) and encloses the distillation/condensation chamber(s) and prevents leakage therefrom. The cover plate(s) is preferably removable from the flow plate(s) on which it is disposed. The cover plate can be composed of the same material as the flow plate and have the same dimensions.

Each flow plate used in the distillation/condensation apparatus of this invention may have a thickness of at least about 0.001 inch, preferably from about 0.001 inch to about 1.0 inch, more preferably from about 0.001 inch to about 0.25 inch, and most preferably from about 0.01 inch to about 0.10 inch.

The flow plate(s) may be metallic or non-metallic. Non-limiting examples of suitable metals for use in the flow plate include, for example, stainless steel, aluminum, aluminum-based alloys, nickel, iron, copper, copper-based alloys, mild steel, brass, titanium and other micromachinable metals. Suitable non-metallic materials for use in the flow plate include, for example, plastics, e.g., thermoplastic engineering resins, such as Lexan polycarbonate, available from General Electric Company; glass; resin-bonded fibrous materials; linoleum; wood; and ceramics.

Preferably, the flow plate(s) is composed of a material which is inert to the fluid stream passing through the channels of the flow plate. Because of its inertness and the relatively low cost associated with its use, stainless steel is particularly useful in the distillation/condensation apparatus of this invention.

A micromachining process is preferably used to form the distillation/condensation chamber(s). Non-limiting examples of suitable micromachining processes include etching, stamping, punching, pressing, cutting, molding, milling, lithographing, particle blasting, or combinations thereof. Preferably, the distillation/condensation chamber and channels are formed by etching. Etching, e.g., photochemical etching, provides a precisely formed distillation/condensation chamber and channels while being less expensive than many other conventional machining processes, such as, for example, drilling, milling and reaming. Furthermore, etched perforations generally do not have the sharp corners, burrs, and sheet distortions associated with mechanical perforations. Etching processes are well known in the art. Typically, etching is carried out by contacting a surface with a conventional etchant.

As stated previously herein, the method of this invention is directed to a method of separating two or more volatility-differing vapor components or liquid components from a mixed fluid stream thereof by means of the distillation/condensation apparatus of this invention. The method involves passing the mixed fluid stream through the at least one distillation/condensation chamber.

FIG. 1 herein illustrates one embodiment of an etched distillation/condensation flow plate within the scope of the present invention.

Flow plate 10 has etched on a front facial surface 12 thereof two distillation/condensation chambers 14 and 16. Chamber 14 contains an inlet port 18 for a fluid mixture to be distilled; a primary flow channel 20; side subchannels 22a, 22b, 24a, and 24b; side outlet channels 22 and 24; overhead subchannels 26a and 26b; and overhead outlet channel 26. Chamber 14 contains two heat exchange conduits 28 and 30 in the form of through-holes for passage therethrough of a first heat exchange fluid F-1. Through-holes 28 and 30 can be surrounded by respective unetched portions 32 and 34 to define flow paths for subchannels 22a, 22b, 24a and 24b.

Chamber 16 contains an inlet port 36 serially joined with channel 26; a primary flow channel 38; side subchannels 40a, 40b, 42a, and 42b; side outlet channels 40 and 42; overhead subchannels 44a and 44b; and overhead outlet channel 44. Chamber 16 contains two heat exchange conduits 46 and 48 in the form of through-holes for passage therethrough of a second heat exchange fluid F-2. Through-holes 46 and 48 can be surrounded by respective unetched portions 50 and 52 to define flow paths for subchannels 40a, 40b, 42a and 42b. Flow plate 10 is preferably oriented in a vertical direction such that inlet channel 18 is disposed below overhead outlet channel 26.

Distillation/condensation of a multicomponent fluid mixture, e.g. a mixed vapor stream composed of three vapor components, by means of flow plate 10 can be carried out as follows. A mixed vapor stream G is fed into distillation/condensation chamber 14 via inlet channel 18. Stream G is passed upwardly through primary flow channel 20 while a first cooling fluid F-1 is fed through through-holes 28 and 30. Heat exchange takes place between stream G and cooling fluid F-1 and causes at least a portion of a first vapor component (not shown) in stream G to condense into a first condensate phase (not shown). Gravity causes substreams C-1 of the condensate phase to pass into subchannels 22a, 22b, 24a, 24b and through channels 22 and 24. A first distillate phase (not shown) passes as distillate substreams D-1 through subchannels 26a and 26b into overhead outlet channel 26 and then into distillation/condensation chamber 16 via inlet channel 36.

Substream D-1 is passed upwardly through primary flow channel 38 while a second cooling fluid F-2, which preferably has a lower temperature than fluid F-1, is fed through through-holes 46 and 48. Heat exchange takes place between substream D-1 and cooling fluid F-2 and causes at least a portion of a second vapor component (not shown) in substream D-1 to condense into a second condensate phase (not shown). Substreams C-2 of the second condensate phase are moved by the action of gravity into subchannels 40a, 40b, 42a, 42b and then into channels 40 and 42. A second distillate phase (not shown) passes as distillate substreams D-2 through subchannels 44a and 44b into overhead outlet channel 44. Distillate substream D-2 can be removed from the distillation/condensation apparatus or can be sent into one or more additional distillation/condensation chambers for additional purification, if needed.

As mentioned previously herein, in the most preferred embodiments of this invention, at least one cover plate is disposed on the at least one flow plate to enclose the at least one distillation/condensation chamber and prevent leakage therefrom. Thus, in a most preferred embodiment of the apparatus shown in FIG. 1, a cover plate (not shown) would be disposed on facial surface 12 of flow plate 10 to enclose distillation/chambers 14 and 16.

Although the present invention has been described with reference to preferred embodiments, those skilled in the art will recognize that changes may be made in form and detail without departing from the spirit and scope of the invention.

What is claimed is:

1. A method of separating two or more volatility-differing vapor components or liquid components from a mixed fluid stream thereof, comprising the steps of:

(A) providing a distillation-condensation apparatus comprising at least one flow plate having formed on a common facial surface thereof at least one distillation-condensation chamber comprising:

an inlet port for said mixed fluid stream;

a primary flow channel in fluid communication with said inlet port and disposed to receive flow of said mixed fluid stream;

one or more heat exchange conduits, each of said one or more heat exchange conduits comprising a through-hole passage transversing said primary flow passage from said common facial surface of said at least one flow plate to an opposite second facial surface of said at least one flow plate, wherein (i) a heat exchange conduit for a cooling fluid is disposed in a heat exchange contact with said primary flow channel sufficient to condense at least a portion of a vapor component in said mixed fluid stream into a condensate phase in said primary flow channel, or (ii) a first heat exchange conduit for a heating fluid is disposed in a heat exchange contact with said primary flow channel sufficient to boil at least a portion of a liquid component in said mixed fluid stream into a vapor phase in said primary flow channel, and a second heat exchange conduit for a cooling fluid is disposed in a heat exchange contact with said primary flow channel sufficient to condense at least a portion of said vapor phase into a condensate phase in said primary flow channel;

at least one side outlet channel, said at least one side outlet channel being disposed in fluid communication with at least one side region of said primary flow channel such that said at least one side outlet channel is disposed to receive flow of at least a portion of said condensate phase from said primary flow channel, said at least one side region being disposed downstream of said inlet port of said primary flow channel; and an overhead outlet port in fluid communication with said primary flow channel, said overhead outlet port being disposed downstream of said at least one side region of said primary flow channel and being disposed to receive flow of any distillate phase and any remaining portions of said condensate phase remaining in said primary flow channel after flow of said at least a portion of said condensate phase into said at least one side outlet channel; and (B) passing the mixed fluid stream into said at least one distillation-condensation chamber through said inlet port and directing said mixed fluid stream through said primary flow channel while directing (i) said cooling fluid through said heat exchange conduit to form said condensate phase or (ii) said heating fluid through said first heat exchange conduit to form said vapor phase and said cooling fluid through said second heat exchange conduit to form said condensate phase; wherein said at least a portion of said condensate phase flows into said at least one side outlet channel, further wherein said any distillate phase and said any remaining portions of said condensate phase flow through said overhead outlet port, whereby said two or more volatility-differing vapor components or liquid components are separated from said mixed fluid stream thereof.

2. A method according to claim 1, wherein said apparatus further comprises at least one cover plate disposed on said at least one flow plate to enclose said at least one distillation-condensation chamber and prevent leakage therefrom.

3. A method according to claim 1, wherein said apparatus comprises a first number of said at least one distillation-condensation chamber and said mixed fluid stream comprises a second number of said volatility-differing components, wherein said first number is at least equal to said second number minus one.

4. A method according to claim 1, wherein said mixed fluid stream comprises a plurality of vapor components.

5. A method according to claim 4, wherein said one or more heat exchange conduits comprises said (i) heat exchange conduit for a cooling fluid.

6. A method according to claim 5, wherein said one or more heat exchange conduits further comprises a second heat exchange conduit for a second cooling fluid, said second heat exchange conduit being disposed in a heat exchange contact with said primary flow channel sufficient to condense into a second condensate phase at least a portion of a second vapor component present in said distillate phase.

7. A method according to claim 6, wherein said second vapor component has a lower boiling point than said vapor component and said second cooling fluid has a lower temperature than said cooling fluid.

8. A method according to claim 1, wherein said mixed fluid stream comprises a plurality of liquid components.

9. A method according to claim 8, wherein said one or more heat exchange conduits comprises said (ii) first heat exchange conduit for a heating fluid disposed in a heat exchange contact with said primary flow channel sufficient to boil at least a portion of said liquid component into a vapor phase, and said second heat exchange conduit for a cooling fluid disposed in a heat exchange contact with said primary flow channel sufficient to condense at least a portion of said vapor phase into a condensate phase.

10. A method according to claim 1, wherein said at least one flow plate is disposed in a vertical direction such that said inlet port is situated below said overhead outlet channel.

11. A method according to claim 1, wherein said apparatus comprises one of said at least one distillation-condensation chamber.

12. A method according to claim 1, wherein said apparatus comprises a plurality of said at least one distillation-condensation chamber, wherein said distillation-condensation chambers are disposed in an end-to-end configuration and/or in a side-by-side configuration.

13. A method according to claim 1, wherein said apparatus comprises one of said at least one flow plate.

14. A method according to claim 1, wherein said apparatus comprises a plurality of said at least one flow plate, wherein said flow plates are disposed in an end-to-end configuration, a side-by-side configuration and/or a front-to-back facial configuration.

15. A method according to claim 1, wherein said at least one flow plate has a thickness of from about 0.001 to about 1.0 inch.

16. A method according to claim 1, wherein each of said at least one distillation-condensation chamber is in the form of a micromachined distillation-condensation chamber on said common facial surface.

17. A method according to claim 16, wherein each of said at least one distillation-condensation chamber is in the form of an etched distillation-condensation chamber on said common facial surface.

18. A method according to claim 1, wherein said through-hole passage transverses said primary flow channel in a direction which is perpendicular to said primary flow channel and said common facial surface.

19. A distillation-condensation apparatus, comprising at least one flow plate having formed on a common facial surface thereof at least one distillation-condensation chamber comprising:

an inlet port for a mixed fluid stream comprising a plurality of volatility-differing liquid or vapor components;

a primary flow channel in fluid communication with said inlet port and disposed to receive flow of said mixed fluid stream;

one or more heat exchange conduits, each of said one or more heat exchange conduits comprising a through-hole passage transversing said primary flow channel from said common facial surface of said at least one flow plate to an opposite second facial surface of said at least one flow plate, wherein (i) a heat exchange conduit for a cooling fluid is disposed in a heat exchange contact with said primary flow channel sufficient to condense at least a portion of a vapor component in said mixed fluid stream into a condensate phase in said primary flow channel, or (ii) a first heat exchange conduit for a heating fluid is disposed in a heat exchange contact with said primary flow channel sufficient to boil at least a portion of a liquid component in said mixed fluid stream into a vapor phase in said primary flow channel, and a second heat exchange conduit for a cooling fluid is disposed in a heat exchange contact with said primary flow channel sufficient to condense at least a portion of said vapor phase into a condensate phase in said primary flow channel;

at least one side outlet channel, said at least one side outlet channel being disposed in fluid communication with at least one side region of said primary flow channel such that said at least one side outlet channel is disposed to receive flow of at least a portion of said condensate phase from said primary flow channel, said at least one side region being disposed downstream of said inlet port of said primary flow channel; and an overhead outlet port in fluid communication with said primary flow channel, said overhead outlet port being disposed downstream of said at least one side region of said primary flow channel and being disposed to receive flow of any distillate phase and any remaining portions of said condensate phase remaining in said primary flow channel after flow of said at least a portion of said condensate phase into said at least one side outlet channel.

20. An apparatus according to claim 19, further comprising at least one cover plate disposed on said at least one flow plate to enclose said at least one distillation-condensation chamber and prevent leakage therefrom.

21. An apparatus according to claim 19, wherein said apparatus comprises a first number of said at least one distillation-condensation chamber and said mixed fluid stream comprises a second number of said volatility-differing components, wherein said first number is at least equal to said second number minus one.

22. An apparatus according to claim 19, wherein said one or more heat exchange conduits comprises said (i) heat exchange conduit for a cooling fluid.

23. An apparatus according to claim 22, wherein said one or more heat exchange conduits further comprises a second heat exchange conduit for a second cooling fluid having a second temperature, said second heat exchange conduit being disposed in a heat exchange contact with said primary flow channel sufficient to condense into a second condensate phase at least a portion of a second vapor component present in said distillate phase.

24. An apparatus according to claim 23, wherein said second vapor component has a lower boiling point than said vapor component and said second cooling fluid has a lower temperature than said cooling fluid.

25. An apparatus according to claim 19, wherein said one or more heat exchange conduits comprises said (ii) first heat exchange conduit for a heating fluid disposed in a heat exchange contact with said primary flow channel sufficient to boil at least a portion of said liquid component into a vapor phase, and said second heat exchange conduit for a cooling fluid disposed in a heat exchange contact with said primary flow channel sufficient to condense at least a portion of said vapor phase into a condensate phase.

26. An apparatus according to claim 19, wherein said at least one flow plate is disposed in a vertical direction such that said inlet port is situated below said overhead outlet channel.

27. An apparatus according to claim 19, wherein said apparatus comprises a plurality of said at least one distillation-condensation chamber, wherein said distillation-condensation chambers are disposed in an end-to-end configuration and/or in a side-by-side configuration.

28. An apparatus according to claim 19, wherein said apparatus comprises one of said at least one flow plate.

29. An apparatus according to claim 19, wherein said apparatus comprises a plurality of said at least one flow plate, wherein said flow plates are disposed in an end-to-end configuration, a side-by-side configuration and/or a front-to-back facial configuration.

30. An apparatus according to claim 19, wherein said at least one flow plate has a thickness of from about 0.001 to about 1.0 inch.

31. An apparatus according to claim 19, wherein each of said at least one distillation-condensation chamber is in the form of a micromachined distillation-condensation chamber of said common facial surface.

32. An apparatus according to claim 31, wherein each on said at least one distillation-condensation chamber is in the form of an etched distillation-condensation chamber on said common facial surface.

33. An apparatus according to claim 19, wherein said through-hole passage transverses said primary flow channel in a direction which is perpendicular to said primary flow channel and said common facial surface.

* * * * *